United States Patent [19]

Henry

[11] Patent Number: 4,917,219

[45] Date of Patent: Apr. 17, 1990

[54] WHEEL CHOCK

[76] Inventor: Stephen K. Henry, P.O. Box 1061, Golden, Colo. 80401

[21] Appl. No.: 801,833

[22] Filed: Nov. 26, 1985

[51] Int. Cl.⁴ ............................................. B60T 3/00
[52] U.S. Cl. ................................... 188/32; 256/13.1; 293/109; 404/6
[58] Field of Search .................. 188/32, 377; 267/139; 404/6, 7; 256/13.1; 293/109

[56] References Cited

U.S. PATENT DOCUMENTS

| | | | |
|---|---|---|---|
| 2,797,774 | 10/1952 | Eckhart | 188/32 |
| 2,848,070 | 8/1957 | Wilson | 158/32 |
| 3,189,127 | 6/1965 | Karnow et al. | 188/32 |
| 3,265,159 | 7/1965 | Worden | 188/32 |
| 3,664,466 | 5/1972 | Rotheiser | 188/32 |
| 3,698,290 | 10/1972 | Wallace | 404/7 |
| 3,800,917 | 4/1974 | Vick | 188/32 |
| 3,819,138 | 6/1974 | Rahkopf et al. | 188/32 |
| 4,134,610 | 1/1979 | Lindewall | 293/109 |
| 4,144,951 | 3/1979 | Rea | 188/32 |
| 4,321,989 | 3/1982 | Meinzer | 188/377 |

Primary Examiner—George E. A. Halvosa
Attorney, Agent, or Firm—Dorr, Carson, Sloan & Peterson

[57] ABSTRACT

A light-weight wheel chock is formed having a thin exterior shell of rigid, chemically-inert plastic material, such as high-density polyethylene, and an interior cavity filled with light-weight rigid or semi-rigid foam, such as high-density polyurethane foam.

1 Claim, 2 Drawing Sheets

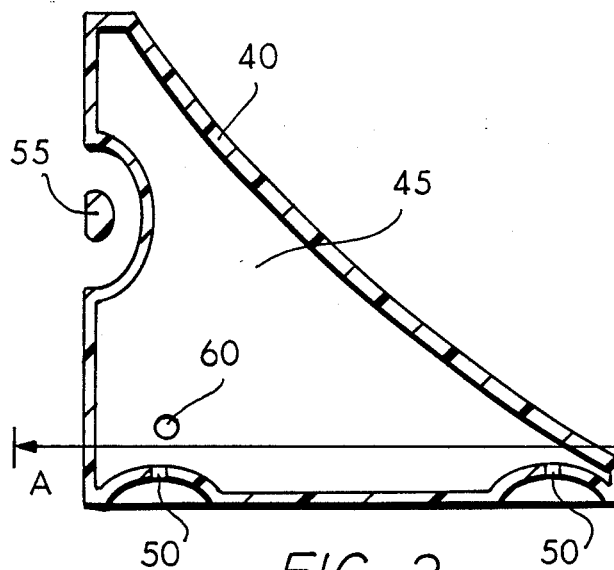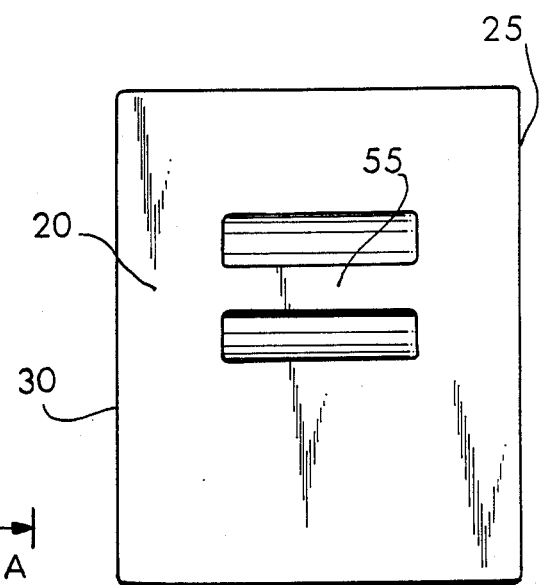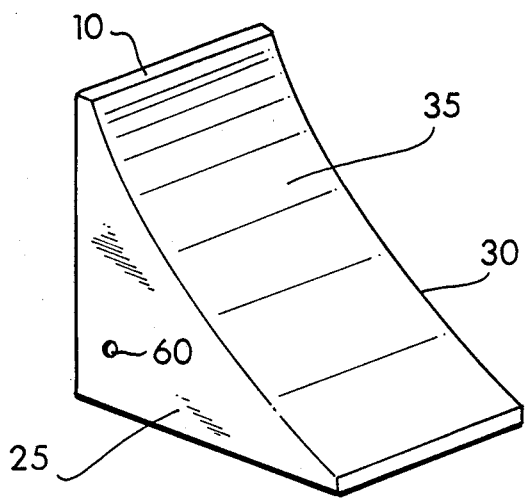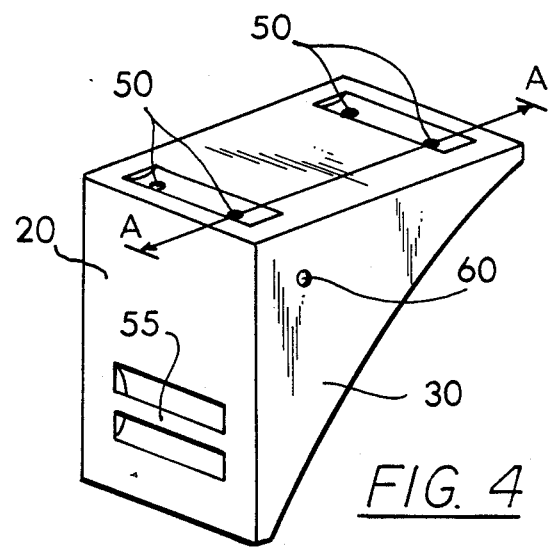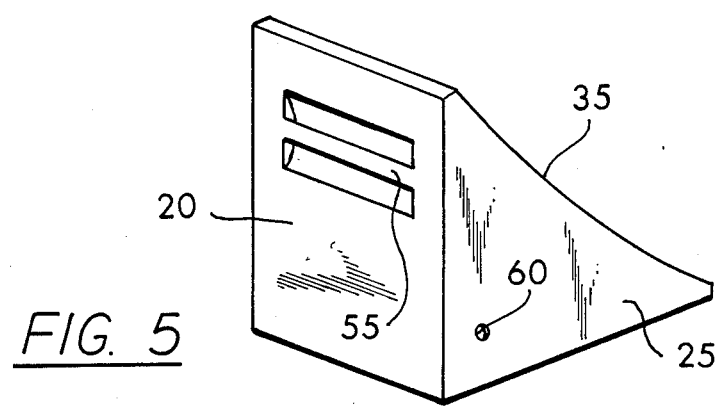

WHEEL CHOCK

BACKGROUND OF THE INVENTION

1. Field of the Invention

The present invention relates generally to the field of wheel chocks, wedges, and blocks. More specifically, the present invention involves the light-weight wheel chock suitable for use with large-scale trucks and other equipment of the type used in strip mines.

2. Prior Art

A wide variety of wheel chocks have long been in public use or shown in the prior art. However, the size of equipment currently used in strip mines presents a unique problem that has heretofore remained without an adequate solution. For example, hauling trucks used in strip mines commonly have wheels with diameters of ten feet or more. Conventional wheel chocks are simply not large enough to be effective when dealing with wheels of this size. However, merely increasing the scale of a conventional metal or wood wheel chock rapidly results in prohibitive weight. Rubber wheel chocks have been employed in the industry for this purpose, but even these weigh sixty to seventy pounds each.

A second concern is the corrosive environment to which wheel chocks are exposed in the mining industry. Metal, wood, or rubber deteriorate when exposed to acid mine drainage, corrosive atmospheric conditions, reagents used in processing ores, oils, greases and hydrocarbon solvents.

SUMMARY OF THE INVENTION

In accordance with the present invention, the wheel chock has a thin exterior shell of high-density polyethylene. The interior cavity of the chock is filled with rigid or semi-rigid high-density polyurethane foam. The present invention overcomes the problems discussed above by means of this light-weight, two-part construction that provides adequate structural properties for its intended purpose. In addition, the polyethylene shell is relatively inert, and does not readily react with chemicals generally found in the mining environment.

DESCRIPTION OF THE DRAWINGS

FIG. 1 is an isometric view of a wheel chock in accordance with the present invention.

FIG. 2 is a sectional side view taken along line A—A shown in FIG. 4.

FIG. 3 is an end view of the wheel chock.

FIG. 4 is another isometric view showing the end and bottom surfaces of the wheel chock of FIG. 1.

FIG. 5 is another isometric view showing the end and side surfaces of the wheel chock of FIG. 1.

DETAILED DESCRIPTION OF THE INVENTION

Figure 6:
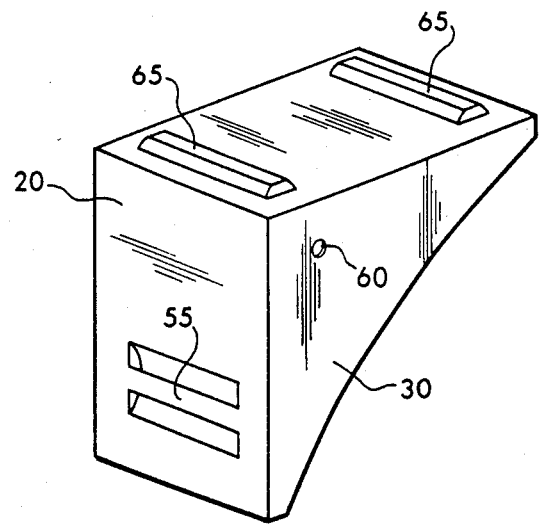
FIG. 6 is another isometric view similar to FIG. 4, showing pads or feet covering the fill holes in the wheel chock.

Turning to the drawings, FIG. 1 shows an isometric view of a wheel chock 10 having a base or bottom surface 15, a back surface 20, two lateral or side surfaces 25 and 30, and either a ramp or concave surface 35 as the hypotenuse between the base and back surfaces. In one embodiment of the invention intended for use with mine hauling vehicles with ten ft. diameter wheels, the base of the wheel chock has a length of approximately 22 inches and a width of 14 inches. The height of the wheel chock is approximately 18 inches. FIGS. 2 through 5 show additional views of the wheel chock.

In the present invention, the wheel chock is formed in a two-step process. An exterior shell is formed of relatively high-strength, chemically inert material. Any number of high-strength plastics can be used for this purpose. In the preferred embodiment, a shell having an approximate thickness of 0.25 inches is formed by rotational molding of crosslinkable high-density polyethylene. Plastic resins of this type include Marlex CL-100 and CL-50 marketed by Phillips Chemical Company of Bartlesville, Okla. The interior cavity of the wheel chock shell is filled with a high-density rigid or semi-rigid foam, such as "Last-a-Foam" polyurethane foam marketed by General Plastics Manufacturing Company of Tacoma, Wash. In the preferred embodiment, a polyurethane foam is used with an approximate density of eight lbs. per cubic foot. This results in a very light-weight core with an ultimate compressive strength in excess of 200 psi.

The exterior shell provides substantial load-bearing capacity, and also serves to protect the foam core from damage by corrosive chemicals and solvents. The foam core offers substantial additional structural support at only a nominal increase in weight.

FIG. 2 shows the two-part construction of the exterior shell 40 and foam core 45 most clearly in a vertical sectional view of the wheel chock, taken along line A—A shown in FIG. 1. FIGS. 2 and 4 also show a particularly advantageous method of introducing the foam into the shell via a number of holes 50 in the base of the wheel chock. These holes are then covered and concealed by pads or feet 65 attached to the bottom surface of the wheel chock to increase traction with the ground, as shown in FIG. 6.

Various additional features can be incorporated into the wheel chock. A handle 55 can be added to the back of the wheel chock. A hole 60 through the wheel chock can also be added to facilitate carrying the wheel chocks on a mine truck by means of a rod or pole, or to allow the chock to be fastened to a rope or cable.

I claim:

1. A wheel chock comprising:
    (a) an exterior shell of polyethylene comprising a base, a back surface, two side surfaces, and a ramp surface as the hypotenuse between the base and back surfaces;
    (b) a core of rigid foam of a secondary material;
    (c) a number of fill holes through the bottom surface of the exterior shell to allow introduction of a secondary material into the interior of the shell to form a core; and
    (d) a number of feet attached to the bottom surface of the exterior shell covering said fill holes.

* * * * *